(12) United States Patent
Osaland et al.

(10) Patent No.: US 10,240,433 B2
(45) Date of Patent: Mar. 26, 2019

(54) HYDRATE PLUG REMOVER

(71) Applicant: Altus Intervention AS, Stavanger (NO)

(72) Inventors: Espen Osaland, Sandnes (NO); Lasse Haugland, Bryne (NO)

(73) Assignee: Qinterra Technologies AS, Stavanger (NO)

( * ) Notice: Subject to any disclaimer, the term of this patent is extended or adjusted under 35 U.S.C. 154(b) by 202 days.

(21) Appl. No.: 15/204,045

(22) Filed: Jul. 7, 2016

(65) Prior Publication Data

US 2016/0312583 A1 Oct. 27, 2016

Related U.S. Application Data

(62) Division of application No. 14/368,752, filed as application No. PCT/NO2013/050006 on Jan. 9, 2013, now Pat. No. 9,416,903.

(30) Foreign Application Priority Data

Jan. 10, 2012 (NO) .................................... 20120023
Jan. 4, 2013 (NO) .................................... 20130006

(51) Int. Cl.
*E21B 27/02* (2006.01)
*E21B 37/02* (2006.01)
*E21B 37/06* (2006.01)
*F16L 55/00* (2006.01)

(52) U.S. Cl.
CPC .............. *E21B 37/02* (2013.01); *E21B 27/02* (2013.01); *E21B 37/06* (2013.01); *F16L 55/00* (2013.01); *Y10T 29/49819* (2015.01); *Y10T 29/53* (2015.01)

(58) Field of Classification Search
CPC .......... E21B 27/02; E21B 37/02; E21B 37/06; F16L 55/00; B08B 9/02
See application file for complete search history.

(56) References Cited

U.S. PATENT DOCUMENTS

| 1,806,478 | A |   | 5/1931 | Long |
| 1,900,029 | A |   | 3/1933 | Taylor |
| 2,187,845 | A | * | 1/1940 | Tatalovich ............... E21B 27/04 166/104 |
| 2,859,827 | A |   | 11/1958 | Elkins et al. |
| 3,572,431 | A |   | 3/1971 | Hammon |
| 5,447,200 | A | * | 9/1995 | Dedora ............... E21B 17/1057 166/105 |
| 5,795,402 | A |   | 8/1998 | Hargett, Sr. et al. |

(Continued)

FOREIGN PATENT DOCUMENTS

| NO | 325339 | 3/2008 |
| WO | 03036020 A1 | 5/2003 |

(Continued)

*Primary Examiner* — Matthew R Buck
(74) *Attorney, Agent, or Firm* — Gable Gotwals

(57) ABSTRACT

This invention relates to a hydrate plug remover for removal of a hydrate plug in a tube. The hydrate plug remover includes a collecting container provided with a valve in a lower end portion. The valve connects the collecting container to surroundings of the hydrate plug remover. The collecting container in an upper end portion is provided with a circulation gate connecting the collecting container to the surroundings of the hydrate plug remover.

6 Claims, 2 Drawing Sheets

(56) References Cited

U.S. PATENT DOCUMENTS

| | | | |
|---|---|---|---|
| 6,220,347 B1* | 4/2001 | Head | E21B 37/00 166/105.3 |
| 6,343,652 B1* | 2/2002 | Corre | E21B 23/14 166/302 |
| 7,044,226 B2* | 5/2006 | Stave | B08B 9/032 134/22.12 |
| 7,905,291 B2* | 3/2011 | Kotsonis | E21B 37/00 166/311 |
| 8,191,623 B2* | 6/2012 | Lynde | E21B 23/00 166/178 |
| 8,316,965 B2 | 11/2012 | Hallundbaek | |
| 8,479,821 B2 | 7/2013 | Crawford | |
| 9,157,290 B2* | 10/2015 | Habesland | E21B 23/14 |
| 2005/0284504 A1 | 12/2005 | Kinnari et al. | |
| 2008/0023033 A1 | 1/2008 | Potter | |
| 2010/0236785 A1 | 9/2010 | Collis | |
| 2011/0315387 A1 | 12/2011 | Gamerov | |
| 2014/0326510 A1* | 11/2014 | Wessel | E21B 34/14 175/61 |

FOREIGN PATENT DOCUMENTS

| | | |
|---|---|---|
| WO | 2008091157 A1 | 7/2008 |
| WO | 2008104177 A1 | 9/2008 |
| WO | 2009020397 A1 | 2/2009 |
| WO | 2010123375 A1 | 10/2010 |
| WO | 2011109102 A1 | 9/2011 |
| WO | 2011145950 A1 | 11/2011 |

* cited by examiner

HYDRATE PLUG REMOVER

CROSS-REFERENCE TO RELATED APPLICATIONS

This application is a divisional application of U.S. patent application Ser. No. 14/368,752 filed 25 Jun. 2014, which claims priority to PCT/NO2013/050006 filed 9 Jan. 2013, which claims priority to Norwegian Patent Application No. 20120023 filed 10 Jan. 2012, which claims priority to Norwegian Patent Application No. 20130006 filed 4 Jan. 2013, each of which is incorporated herein by reference.

STATEMENT REGARDING FEDERALLY SPONSORED RESEARCH

Not Applicable

NAMES OF THE PARTIES TO A JOINT RESEARCH AGREEMENT

Not Applicable

BACKGROUND OF THE INVENTION

The present invention relates to a method for removal of a hydrate plug. More specifically it relates to a method for removal of a hydrate plug in a tube in connection with a petroleum well where the method comprises to provide a wireline tractor provided with a collecting container. The invention also comprises a device for performing the method.

Under unfavorable conditions in tubes in connection with petroleum wells, so-called hydrate plugs may be formed. Hydrate plugs are constituted of a material similar to wax, which may be dissolved by means of heat or by means of a hydrate dissolving fluid, for example methanol or monoethylene glycol.

Hydrate plugs are often formed relatively high up in well systems. Wells on the seabed are especially exposed because of the relatively low temperature there.

It might be quite complicated to get access to hydrate plugs, especially in wells where the well completion takes place on the seabed. In order to dissolve hydrate plugs in such wells, it may be necessary to use a vessel for the well intervention.

Circulation of hydrate dissolving fluid by means of a coil tubing has shown to be efficient in the removal of hydrates. However, the method requires rigging up of a considerable amount of device and thus is both time consuming and expensive.

It is also known to displace a heating element down to the hydrate plug in order to melt it. However, prior art in this field is not efficient and melting of the hydrate plug thus uses disproportionately much time. The patent WO2011/145950 discloses such a method.

Patent WO03/036020 discloses a wireline tractor provided with a collector and a scraping device. The wireline tractor is displaced to where sand and other deposited impurities completely or partially block the passage in a tube. The scraping device pulls loose the material and the loosened material is thereafter moved into the collector. The wireline tractor with the collector is brought to the surface and the collector is emptied. This is done by having the wireline tractor taken out of a sluice. The scraping device is not suitable for pulling of hydrate from a hydrate plug.

A method comprising a wireline tractor has the advantage of being carried out by means of light intervention devices.

BRIEF SUMMARY OF THE INVENTION

The invention has for its object to remedy or to reduce at least one of the drawbacks of the prior art, or at least to provide a useful alternative to prior art.

The object is attained through features described in the description given below and in the subsequent patent claims.

In a first aspect, the present invention concerns a method for removal of a hydrate plug in a tube in connection with a petroleum well, the method comprising: to provide a hydrate plug remover, the hydrate plug remover comprising a collecting container. The method further comprising to position the hydrate plug remover in a sluice; fill the sluice with hydrate dissolving fluid; fill the collecting container, which is provided with a valve in the lower end portion of the collecting container, with hydrate dissolving fluid through the valve; pressure test the sluice; displace the hydrate plug remover from the hydrate plug and let the hydrate dissolving fluid flow towards the hydrate plug via a circulation gate in the upper end portion of the collecting container; lead dissolved hydrate from the hydrate plug into the collecting container through the valve; and displace the hydrate plug remover to the sluice where the collecting container is emptied of hydrate through the circulation gate while hydrate dissolving fluid flows into the collecting container through the valve.

A "sluice" denotes a sluice where the collecting container by known way per se is sluiced into the well. The sluice and a portion downwards from the sluice itself is filled with hydrate dissolving fluid. The hydrate dissolving fluid present in the sluice, may be circulated into the collecting container at the same time as a possible hydrate present in the collecting container is circulated out of the collecting container and further out of the sluice while the collecting container is present inside the sluice. The wireline tractor is thereafter displaced together with the collecting container to the hydrate plug. The hydrate dissolving fluid is thereafter led towards the hydrate plug which is dissolved. More or less dissolved hydrate material is simultaneously displaced into the collecting container before this is transported back to the sluice and emptied.

Several ways of displacing hydrate into the collecting container are known. Negative pressure filling and mechanical feeding are well known to a person skilled in the art.

The method may be repeated until the hydrate plug is removed while the wireline tractor is within the well and the sluice the whole time. It is thus unnecessary to remove the wireline tractor with the collecting container from the sluice each time it is to be emptied or filled.

In a second aspect, the invention concerns a hydrate plug remover for removal of a hydrate plug in a tube where the hydrate plug remover comprises a collecting container. The collecting container is provided with a valve in its lower end portion, the valve connecting the collecting container to the surroundings of the hydrate plug remover, and the collecting container in its upper end portion being provided with a circulation gate connecting the collecting container to the surroundings of the hydrate plug remover.

The hydrate plug remover may in its lower end portion be provided with a drill, a scrape or another suitable device for mechanical machining of the hydrate plug. The drill may be driven by means of a motor. The drill or similar, and/or a shaft connecting the drill to the motor, may preferably also have a function for feeding hydrate into the collecting container.

The valve in the lower end portion of the hydrate plug remover may be arranged to be able to keep the hydrate dissolving fluid inside the collecting container until the hydrate dissolving fluid is to flow towards the hydrate plug. When the collecting container is close to the hydrate plug, the hydrate dissolving fluid flows out through the circulation gate and sinks due to higher specific gravity than the surrounding fluid, down to the hydrate plug where it is mixed with hydrate at the same time as the drill is machining the hydrate plug and is feeding the partly dissolved hydrate into the collecting container.

The circulation gate may be provided with a valve.

The collecting container is emptied and filled in the sluice as described above. On activating the motor, the circulation is starting up and hydrate is circulated out through the circulation gate at the upper portion of the collecting container at the same time as hydrate dissolving fluid is circulated in at the lower portion of the collecting container. The valve situated by the lower portion is automatically closed on deactivation.

The hydrate plug remover may be connected to a wireline tractor. The wireline tractor may be provided with wheels or belts. The wireline tractor may be provided with a roller torsion anchoring device. That is, the wheels or the belts of the wireline tractor are also designed to be able to absorb torsion from the drill, scrape or similar suitable device.

The wireline tractor may be provided with a brake function. The wheels or belts of the wireline tractor might be decelerated in order to avoid that the wireline tractor is unintentionally displaced, for example, due to penetration of gas in the hydrate plug.

The method and device in accordance with the invention make possible improved efficiency on removal of hydrate plugs where a wireline tractor with a hydrate plug remover provided with a collecting container is used. Use of a hydrate dissolving fluid speeds up the dissolving rate at the same time as repetition of the working operation without having to run the wireline tractor out through the pressure barrier of the well, simplifies the operation considerably.

BRIEF DESCRIPTION OF THE DRAWINGS

In the following an example of a preferred embodiment which is illustrated in the enclosed drawings, is described, where.

DETAILED DESCRIPTION OF THE INVENTION

Figure 1:
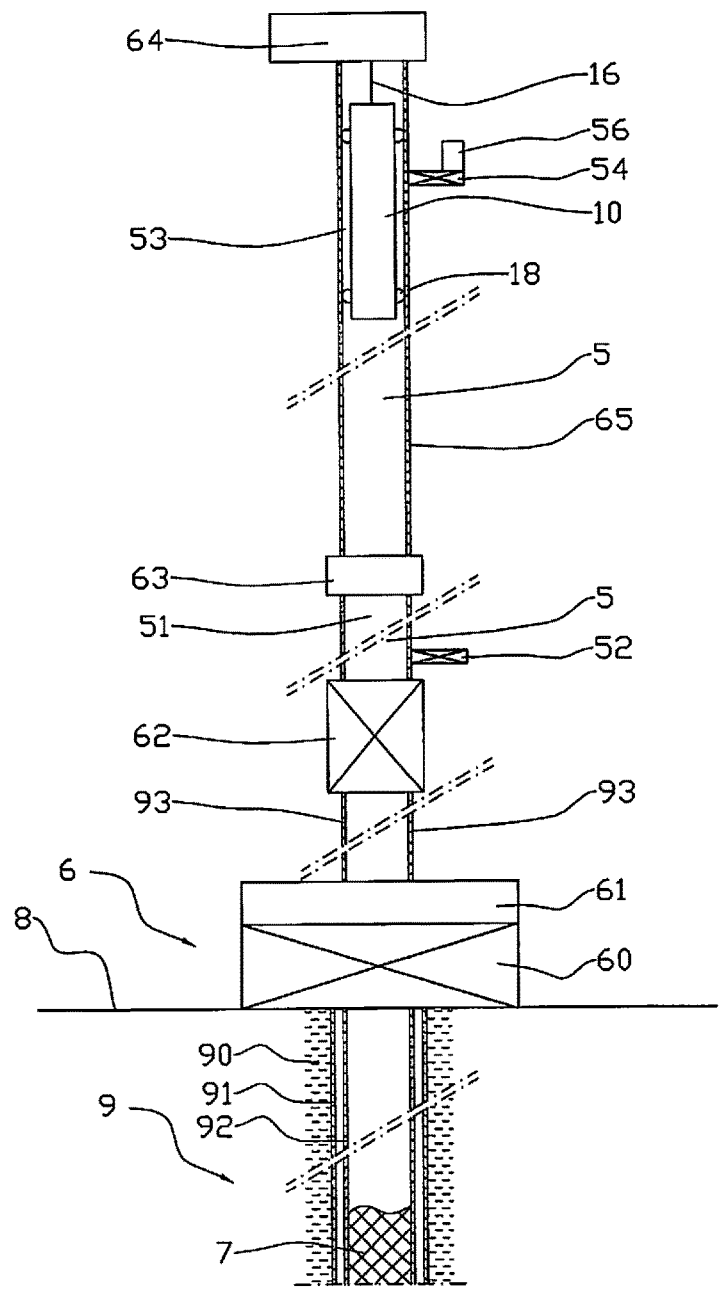
FIG. 1 shows prior art schematically, with a hydrate plug relatively high up in a petroleum well, the petroleum well is provided with a barrier at the seabed, a riser, a wellhead and a sluice above the wellhead.

In the figures the reference numeral 9 denotes a petroleum well in accordance with prior art. The petroleum well 9 is located in a formation 90 and is lined by means of a casing 91. The well 9 extends downwardly in the formation 90 from a seabed 8. A production tubing 92 runs inside the well 9. A hydrate plug 7 has formed relatively high up in the production tubing 92. The hydrate plug 7 hinders normal production from the petroleum well 9 and thus has to be removed.

At the seabed 8 a barrier 6 is positioned. The barrier 6 comprising a well valve 60 and an exhaust valve 61. An exhaust valve 61 is known as a BOP (Blow Out Preventer) 61 within the field. A riser 93 extends from the barrier 6 and up to the surface (not shown) in accordance with prior art.

On a production platform (not shown) a wellhead 62 is positioned on the upper end of the riser 93 as it is known in the field. In order to be able to perform maintenance work in the well 9, a sluice 5 for transporting a known tool is temporarily positioned on the wellhead 62, said known tool is in FIG. 1 illustrated as being a wireline tractor 1 of known type per se, into the well 9. The sluice 5 comprises a lower portion 51 known as a riser within the field. The lower portion 51 extends from the wellhead 62 and to a BOP 63. The sluice further comprises an upper portion 53 extending from the BOP 63 and to an upper pressure barrier 64. The upper portion 53 is called a lubricator 65 within the field. The shown sluice 5 is suitable for inserting of a so-called wireline tool. The upper pressure barrier 64 is constituted of a so-called grease-head, as known within the field, and this is not further discussed.

The sluice 5 is in its lower portion 51 provided with a lower gate 52 for insertion of fluid into the sluice 5. The sluice 5 is in its upper portion 53 provided with an upper gate 54 for draining off of fluid from the sluice 5 in accordance with prior art.

The wireline tractor 1 provided with the desired tool is positioned inside the upper portion 53 of the sluice 5 in a known way, and this is not further discussed. The wire 16 of the wireline tractor 1 is lead out of the sluice 5 through the pressure barrier 64. Fluid is introduced into the sluice 5 through the lower gate 52. The sluice 5 is pressure tested. After a successful pressure testing, the pressure equal to the pressure upstream of the wellhead 62, is maintained in the sluice 5. The wellhead 62 is opened and the wireline tractor 1 is lowered downwardly in the riser 93, past the barrier 6 and into the well 9.

In accordance with prior art, for example disclosed in WO 03/036020, a tool 10 may be arranged to transport a material, as for example sand, out of the well 9 and bring this up to the surface, that is up past the wellhead 62 and into the sluice 5. In order to empty the tool 10 of material, the wellhead 62 is closed, the pressure in the sluice 5 is reduced to ambient pressure, fluid in the sluice 5 is drained off, the sluice 5 is released from the wellhead 62 and the tool 10 is removed from the sluice 5. The tool 10 may thereafter be emptied of material. If there is still any material left in the well 9, the operation is repeated. A person skilled in the art will know that this is a time consuming operation.

Figure 2:
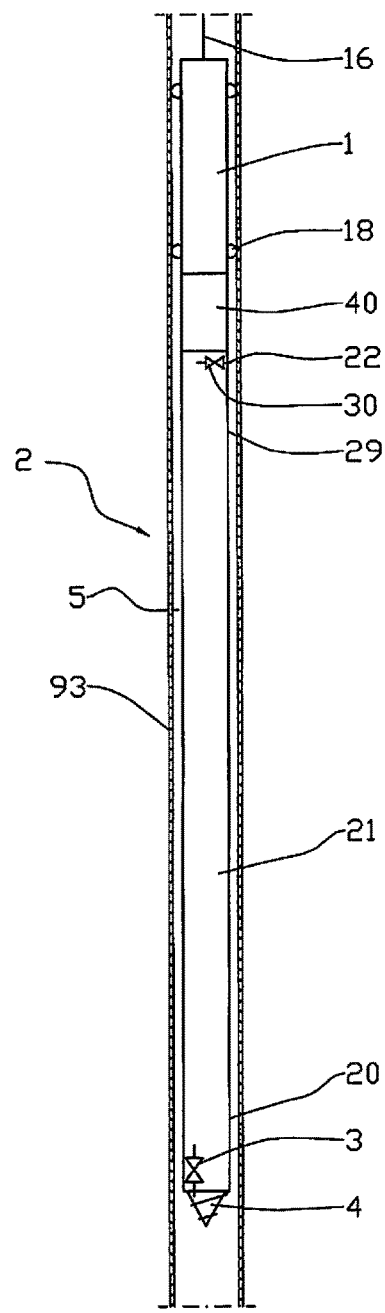
FIG. 2 shows schematically a wireline tractor provided with a hydrate plug remover in accordance with the invention, in the sluice shown in FIG. 1.
Figure 3:
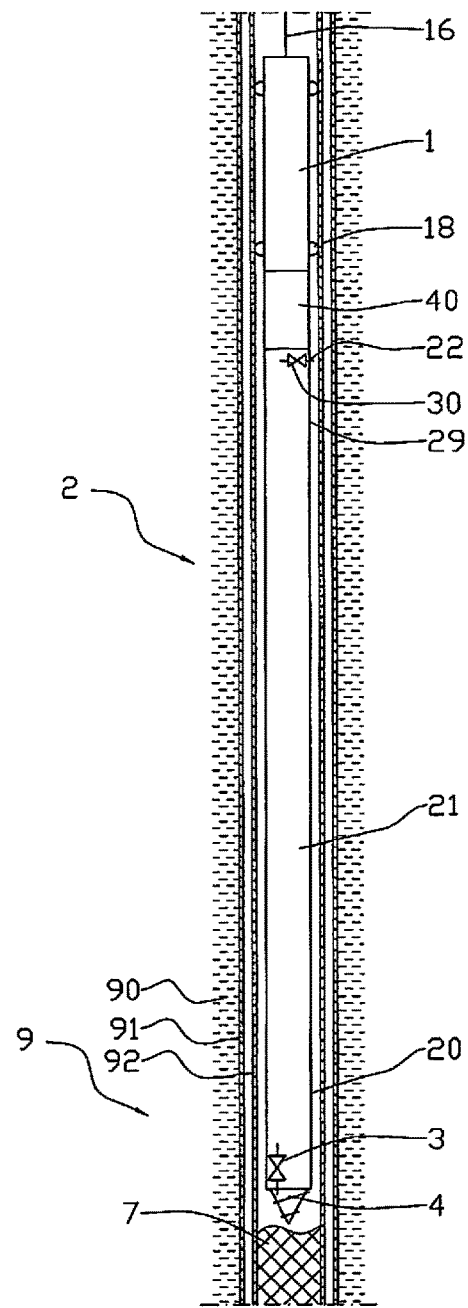
FIG. 3 shows schematically the wireline tractor provided with the hydrate plug remover in position with a hydrate plug in the petroleum well.

A wireline tractor 1 of known type per se provided with a hydrate plug remover 2, according to the present invention, is shown in the FIGS. 2 and 3. At the lower portion 20 of the hydrate plug remover 2, there is provided a drill and a scrape 4. The drill 4 is driven by a motor 40. The hydrate plug remover 2 comprises a collecting container 21. In the lower portion 20 of the collecting container 21, a valve 3 is arranged between the collecting container 21 and the surroundings of the hydrate plug remover 2. The valve 3 may be a one-way valve, for instance a flap-valve. The valve 3 is arranged to be able to keep a fluid in the collecting container 21. At the upper portion 29 of the collecting container 21 there is provided a circulation opening 22 between the collecting container 21 and the surroundings of the hydrate plug remover 2. The circulation opening 22 may optionally be provided with a circulation valve 30.

The wireline tractor 1, connected to an electric wireline 16 of known type per se, is sluiced into the sluice 5 as described above, and as shown in FIG. 2. The sluice 5 sealed towards the surroundings as described above, is filled with hydrate dissolving fluid. Hydrate dissolving fluid is filled from the sluice 5 and into the collecting container 21 through the valve 3. The hydrate dissolving fluid may be circulated out of the collecting container 21 through the circulation gate 22. The drill 4 may circulate hydrate containing fluid through the valve 3 such that the collecting container 21 is filled with hydrate dissolving fluid. The valve 3 is automatically closed as the circulation is terminated.

The wireline tractor 1 is displaced out of the sluice 5 and down to the hydrate plug 7 through the wellhead 62 and the barrier 6 in a known way per se, see FIG. 3. When the hydrate plug 7 is to be removed, both the valve 3 and possibly the optional valve 30 in the circulation gate 22, are opened. The drill 4 is started up by means of the motor 40 and begins machining the hydrate plug 7. Ambient fluid will flow into the collecting container 21 through the valve 3 together with loosened material from the hydrate plug 7. Inflowing fluid in the lower portion 20 of the collecting container 21 will force the hydrate dissolving fluid from the upper portion 29 of the collecting container 21 through the circulation gate 22. Since the hydrate dissolving fluid typically has a higher specific gravity than the ambient fluid, the hydrate dissolving fluid sinks from the circulation gate 22 and down towards the hydrate plug 7 on the outside of the hydrate plug remover 2. The hydrate dissolving fluid will contribute to the removal of the hydrate plug 7.

The working diameter of the drill 4 is known. The volume of the collecting container 21 is known. As the wireline tractor 1 with the hydrate plug remover 2 is working its way through the hydrate plug, the wireline tractor 1 will move along the production tube 92. The length of this movement is measured and may be reported in a known way to an operator. The operator thus will know the filling ratio of hydrate in the collecting container 21. The operator may decide whether the collecting container 21 is to be filled partly with hydrate, be filled completely with hydrate, or be overfilled with hydrate. Overfilling results in hydrate flowing out of the circulation gate 22.

After the partly or completely emptying of hydrate dissolving fluid from the collecting container 21, and hydrate has been fed into the collecting container 21, the valve 3 closes automatically on deactivating of operation of the drill 4. The wireline tractor 1 with the hydrate plug remover 2 is displaced up to the sluice 5 through the barrier 6 and the wellhead 62. The wellhead 62 is closed.

The pressure in the sluice 5 is reduced to a desired pressure lower than the pressure in the well 9. The pressure may be the same as the ambient pressure of the sluice 5. In the sluice 5 the collecting container 21 is emptied of hydrate and fluid through the circulation gate 22 by the screw 4 circulating in fresh, hydrate dissolving fluid from the sluice 5 through the valve 3. At the same time further fresh, hydrate dissolving fluid is led into the sluice 5 through the lower gate 52, while the mixture of used hydrate dissolving fluid, hydrate and well fluid from the collecting container 21 are drained out through the upper gate 54. Since the hydrate dissolving fluid typically has a higher specific gravity than the material of the hydrate plug and the well fluid, the fluid mixture from the collecting container 21 will be located in the top of the sluice 5. Optionally a temperature sensor 56 may measure the temperature of the fluid which is drained from the upper gate 54. The fluid mixture from the collecting container 21 will show a temperature different from the temperature of fresh, hydrate dissolving fluid. The temperature sensor 56 will thus be able to give a signal when the collecting container 21 is emptied of collected material.

When the collecting container 21 is emptied of collected material it is at the same time filled with fresh, hydrate dissolving fluid. The pressure in the sluice 5 is raised until the pressure is the same as the pressure upstream of the wellhead 62 and the wireline tractor may be run down again to the hydrate plug. The method may be repeated until the hydrate plug 7 is removed. Thereafter the wireline tractor 1 together with the hydrate plug remover is removed from the sluice 5 in a known way. The method has amongst others the advantage that it is not necessary to pressure test the sluice 5 for each run. The method also has the advantage that there is no dismantling work to be done. This saves a lot of time.

The person skilled in the art will understand that due to the invention both mechanical machining of the hydrate plug 7 with the drill 4 and leading of machined material into the collecting container 21, and in a controlled way leading the hydrate dissolving fluid down to the hydrate plug 7, are achieved. The hydrate dissolving fluid will also work on the hydrate plug 7 while the wireline tractor 1 with the hydrate plug remover 2 is hoisted up to the sluice 5. This will help to dissolve the hydrate plug 7 in order for it to be easier to machine when the hydrate plug remover 2 again is brought into contact with the hydrate plug 7.

The wheel 18 of the wireline tractor 1 works as a roller torsion anchor and withstands the torque from the drill 4. The motor 40 may be connected to the drill 4 by means of a shaft (not shown) which extends axially through the collecting container 21. The shaft may be designed as a transport screw in a portion inside the collecting container 21, in order to further be able to lead material from the lower portion 20 of the collecting container 21 and to the upper portion 29.

The invention is shown together with a sluice 5 positioned at the surface. The person skilled in the art will know that the sluice 5 may be positioned on a wellhead 62 located at a seabed 8. The person skilled in the art will know how such a sluice 5 should be constructed and operated. The hydrate plug remover 2 may be operated from such a submerged sluice 5 and the method described may be performed on such a submerged sluice 5. This has the advantage that much time is saved by not having to hoist the wireline tractor up through the riser to the surface.

What is claimed is:

1. A hydrate plug remover (2) for removal of a hydrate plug (7) in a tube (92), said hydrate plug remover (2) comprises:
    a lower end portion (20) of a collecting container (21) is provided with a drill (4) driven by a motor (40) and a valve (3) for inflowing fluid and hydrate from said hydrate plug connecting the collecting container (21) to surroundings of the hydrate plug remover (2); and
    an upper end portion (29) of the collecting container (21) is provided with a circulation gate (22) connecting the collecting container (21) to the surroundings of the hydrate plug remover (2), said circulation gate (22) adapted for flowing out of said hydrate.

2. The hydrate plug remover (2) in accordance with claim 1, wherein the circulation gate (22) is provided with a valve (30).

3. The hydrate plug remover (2) in accordance with claim 1, wherein the hydrate plug remover (2) is connected to a wireline tractor (1).

4. The hydrate plug remover in accordance with claim 3, wherein the wireline tractor (1) is provided with a roller torsion anchor function (18).

5. The hydrate plug remover (2) in accordance with claim 1, wherein the circulation gate (22) is not provided with a filter.

6. The hydrate plug remover (2) in accordance with claim 1, wherein the motor (40) is positioned at an opposing side of the collecting container (21) to the drill (4).

* * * * *